United States Patent

[11] 3,632,135

| [72] | Inventors | Richard Chute<br>Huntington Woods;<br>Russell J. Bergendahl, Detroit, both of Mich. |
|---|---|---|
| [21] | Appl. No. | 857,733 |
| [22] | Filed | Sept. 15, 1969 |
| [45] | Patented | Jan. 4, 1972 |
| [73] | Assignee | Eaton Yale & Towne Inc.<br>Cleveland, Ohio |

[54] RESERVOIR IN THE STEERING COLUMN
10 Claims, 3 Drawing Figs.

[52] U.S. Cl. ................................................ 280/150 AB, 74/492
[51] Int. Cl. ..................................................... B60r 21/08
[50] Field of Search ........................................ 280/150 AB; 74/492; 180/78; 222/3; 239/555; 9/11 A, 316

[56] References Cited
UNITED STATES PATENTS

| 2,621,722 | 12/1952 | Abrams .......................... | 239/555 |
| 3,477,740 | 11/1969 | Hass .............................. | 280/150 AB |
| 3,506,281 | 4/1970 | Berryman ..................... | 280/150 AB |
| 3,525,536 | 8/1970 | Pruneski ....................... | 280/150 AB |
| 3,539,200 | 11/1970 | Chute ........................... | 280/150 AB |

FOREIGN PATENTS

| 208,949 | 10/1905 | Germany ..................... | 239/555 |

*Primary Examiner*—Leo Friaglia
*Assistant Examiner*—John A. Pekar
*Attorney*—Yount, Raney, Flynn & Tarolli ABSTRACT: A safety apparatus for protecting an operator or occupant of a vehicle during a collision includes a confinement having a collapsed condition and an expanded condition for restraining movement of the occupant during an accident. The safety apparatus also includes a closed elongated fluid reservoir for providing a pressurized fluid supply for inflating the confinement, and diffuser means in fluid communication with the closed elongated fluid reservoir and the confinement. The diffuser directs fluid from the closed elongated fluid reservoir to expand the confinement from the collapsed condition to the expanded condition. The safety apparatus also has one end of the reservoir drivingly connected to a steering wheel such that the steering wheel is prohibited from axial movement with respect to the reservoir. The other end of the reservoir is drivingly connected to a steering column member such that when torque is exerted on the steering wheel by the operator of the vehicle, the torque will be transmitted through the reservoir to a steering column member for steering the vehicle. The confinement is mounted on the steering wheel and is adapted to be expanded by the pressurized fluid contained in the reservoir upon the occurrence of an accident to protect the operator or occupant of the vehicle.

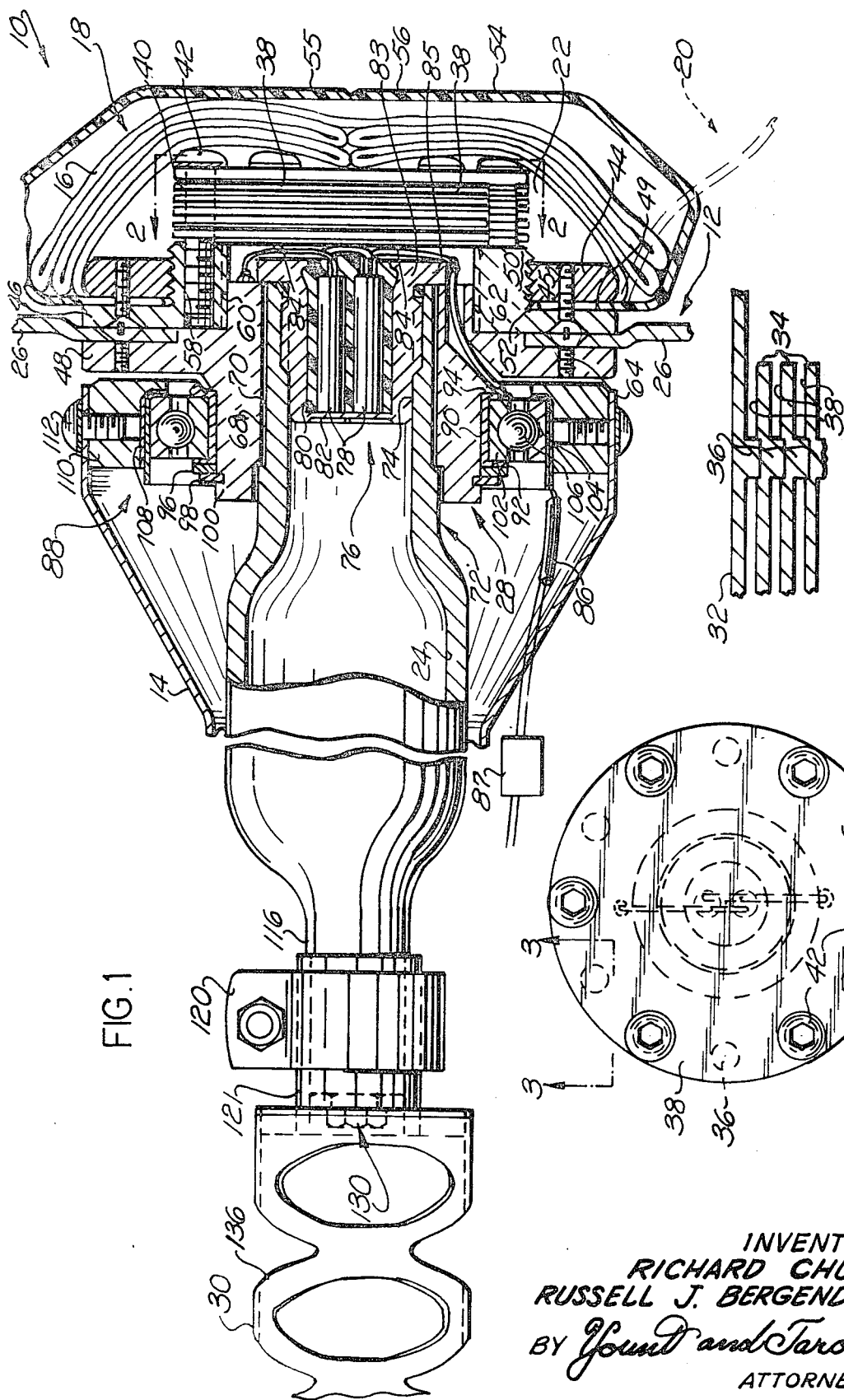
INVENTORS
RICHARD CHUTE
RUSSELL J. BERGENDAHL
BY Yount and Tarolli
ATTORNEYS

RESERVOIR IN THE STEERING COLUMN

The present invention relates to a vehicle safety apparatus for protecting the operator or occupant of a vehicle and more particularly relates to a safety apparatus which may be used in conjunction with and defining a part of the steering assembly of the vehicle.

Known safety devices include a confinement which is inflated by pressurized fluid directed into the confinement by a diffuser. The inflated confinement protects the operator of a vehicle by restraining his movement as a result of an accident by minimizing the impact of the occupant against structural parts of the vehicle. Such safety devices used in conjunction with a steering assembly are shown in copending applications Ser. No. 674,810 now U.S. Pat. No. 3,539,200, and Ser. No. 808,704, filed Mar. 19, 1969 assigned to the assignee of the present invention. U.S. Pat. No. 2,899,214 also discloses a system having an inflatable cushion associated with a steering assembly.

The present invention provides a safety apparatus for protecting the operator or occupant of a vehicle by providing a safety device with a practical design which minimizes the functional utilization of each of the parts of the system. The immediate invention includes a confinement in fluid communication with an elongated fluid reservoir which is adapted to transmit torque from the steering wheel of the vehicle therethrough. The diffuser is of a simple design to provide for effective diffusion of the fluid from the reservoir to expand the confinement.

The safety apparatus of the present invention also provides a novel structure for clamping the confinement in position. Furthermore, the present invention utilizes a bearing for supporting the reservoir and for transmitting an electrical signal from the sensing device to a value means which controls fluid flow from the reservoir. By so transmitting the electrical signal, it is possible to simplify such structure.

Accordingly, it is an object of the present invention to provide a new and improved safety apparatus for mounting on a steering wheel of a vehicle and which includes a confinement in fluid communication with an elongated closed fluid reservoir wherein the reservoir is connected to the steering wheel by drive means such that the entire reservoir rotates and transmits torque from the steering wheel to a steering column member.

A further object of the present invention is to provide a new and improved safety apparatus for mounting on a steering wheel of a vehicle and which includes a confinement in fluid communication with an elongated fluid reservoir wherein the reservoir is drivingly connected to the steering wheel by drive means such that the reservoir transmits torque from the steering wheel to the steering column member and which includes a new, simple diffuser which effectively diffuses the fluid from the reservoir into the confinement to expand the confinement.

A still further object of the present invention is to provide a new and improved safety apparatus for mounting on a steering wheel of a vehicle and which includes a diffuser for conducting fluid therethrough and which is constructed of a plurality of spaced plates with the spaces functioning as flow passages.

Yet another object of the present invention is the provision of a new and improved safety apparatus for mounting on a steering wheel of a vehicle and which includes a confinement in fluid communication with an elongated fluid reservoir and wherein the reservoir is drivingly connected to the steering wheel by drive means and the confinement is clamped to the drive means by a clamping member.

Still a further object of the present invention is the provision of a new and improved safety apparatus for mounting on a steering wheel of a vehicle and which includes a confinement in fluid communication with an elongated fluid reservoir and wherein the reservoir is drivingly connected to the steering wheel by drive means such that the reservoir transmits torque from the steering wheel to a steering column member and includes a ball bearing for supporting the reservoir for rotation and which provides for transmission of an electrical signal to a valve means mounted in conjunction with the reservoir to control fluid flow therefrom.

Further objects and advantages of the present invention will be apparent from the following detailed description of the present invention made with reference to the accompanying drawings wherein:

FIG. 1 is a partial cross-sectional view showing a safety apparatus mounted on the structural members of a vehicle;

FIG. 2 is an end view of a portion of the safety apparatus sown in FIG. 1 taken along lines 2'2 thereof; and FIG. 3 is a partial cross-sectional view of the portion of the safety apparatus shown in FIG. 2 taken along lines 3—3 thereof.

The present invention provides for a new and improved safety apparatus for protecting an operator or occupant of a vehicle during a collision. The safety apparatus includes a confinement having a collapsed inoperative condition and an expanded operative condition. The confinement is mounted in conjunction with the steering assembly of the vehicle such that when it is in its expanded operative condition it is operable to restrain movement of the operator of the vehicle during a collision. The confinement is expanded by the flow of pressurized fluid from an elongated fluid reservoir which supplies the fluid to the confinement through a diffuser. The reservoir is attached to the steering wheel to transmit torque from the steering wheel to a steering shaft of the vehicle. The improved safety apparatus of the immediate invention provides a practical design which maximizes the functional utilization of each of the parts of the system. The present invention applies to safety apparatuses of a wide variety of constructions and designs and for purposes of illustration is described and illustrated as applicable to the safety apparatus generally indicated at 10 in FIG. 1.

The vehicle safety apparatus 10 is mounted in conjunction with and defining a part of the steering assembly 12 of a vehicle. The steering assembly 12 of the vehicle is mounted on a structural member of the vehicle such as a housing member 14. The safety apparatus 10 of the present invention includes a confinement 16 which has a collapsed inoperative condition 18 shown in full lines in FIG. 1 and an expanded operative condition 20, as partially shown in dotted lines in FIG. 1. The confinement 16 when in the expanded operative condition 20 will restrain forward movement of an occupant of the vehicle during a collision.

To direct fluid to expand the confinement 16 from the collapsed condition 18 to the expanded condition 20, a diffuser 22 is provided. The diffuser 22 is in fluid communication with the interior of the confinement 16. The diffuser 22 is also in fluid communication with a closed elongated fluid reservoir 24 which provides a fluid supply for inflating the confinement 16.

The steering assembly 12 of the vehicle includes a steering wheel having arms 26 partially shown in FIG. 1. The arms 26 are fixedly attached to one end of the reservoir 24 by drive means generally indicated at 28. When the operator of the vehicle desires to change the direction of the vehicle he turns the steering wheel and the arms 26 transmit torque through the drive means 28 to the one end of the reservoir 24. The other end of the reservoir is drivingly connected to a steering shaft 30.

The diffuser 22, as shown in FIGS. 2 and 3, includes an end plate 32 and a plurality of diffuser plates 34. The diffuser plates 34 are spaced from one another and the end plate to allow fluid to flow from the reservoir and radically therefrom through the spaces therebetween into the confinement 16 for expanding the confinement. Extending portions 36 are formed on the plates 32 and 34 to space the diffuser plate 34 and plate 32. A central opening 38 is provided in each of the plates 34 to allow the fluid to flow from the reservoir into the plates 34 so as to be directed therefrom. Openings 40 are provided in the plates 32, 34 to receive threaded fasteners 42 therein. The threaded fasteners 42 threadedly engage the drive means 28 such that the diffuser 22 is secured thereto.

A clamping ring 44 is adapted to threadedly engage the drive means 28 to clamp the confinement 16 thereto. The drive means 28 includes a connecting member 46 and a splined member 48. The members 46, 48 are generally circular in configuration. The connecting member 46 has a portion thereof defining a surface 49 from which an extending portion 50 extends. The extending portion 50 is generally circular in configuration. The outwardly extending portion 50 has exterior threads formed thereon for threadedly engaging the interior threads formed on the clamping ring 44.

The confinement 16 has an opening 52 therein adapted to receive the extending portion 50 of the connecting member 46. The clamping ring 44 threadedly engages the extending portion 50 of the connecting member 46, and is rotated until the portion of the confinement 16 interposed between the clamping member 44 and surface 49 of the connecting member 46 is retained or clamped therebetween. It should be understood that the clamping ring 44 need not be threadedly engaged with the extending portion 50 of the connecting member 46 of the drive means 28, but may rather be connected to the drive means by any conventional securement means such as threaded fasteners attaching the clamping ring 44 to the drive means 28.

A cover member 54 is positioned to enclose the confinement 16 when the confinement 16 is in the collapsed inoperative condition 18. The cover 54 may be a decorative cover and has opposite portions 55, 56 which are centrally joined. It should be understood that this joint is broken upon expansion of the confinement 16 and pivots out of the way so as not to interfere with the expansion of the confinement.

The connecting member 46 has threaded openings 58 therein adapted to receive the threaded fasteners 42. The threaded fasteners 42 retain the diffuser 22 with respect to the connecting member 46. The connecting member 46 also has internal spines 60 thereon adapted to engage external splines 62 on the splined member 48 to drivingly connect the connecting member 46 with the splined member 48.

Common apertures 64 are provided in the connecting member 46, arms 26 and splined member 48 with the portion of the common opening 64 in the splined member 48 having internal threads therein adapted to threadedly engage threaded fasteners 66 to thereby secure these members together. Thus, upon rotation of the arms 26, the members 46, 48 are rotated therewith. The splined member 48 has internal splines 68 adapted to engage external splines 70 on the one end 72 of the reservoir 24. Accordingly, rotation of the member 48 results in rotation of the reservoir 24.

The member 48 is fixed against movement relative to the reservoir in an axial direction. The member 48 at one end abuts a flange portion 85 of the plug 83. This prevents movement of the member 48 toward the right as viewed in FIG. 1. Movement of the member 48 toward the left, as viewed in FIG. 1, relative to the reservoir 24 is prevented by abutment of the left end of the member 48, as viewed in FIG. 1, on the reservoir 24.

The end 72 of the reservoir 24 has an opening 74 therein which receives a valve means 76 therein. The valve means 76 may be of any construction such as is shown in U.S. Pat. application Ser. No. 730,024, now U.S. Pat. No. 3,567,245 assigned to the assignee of the present invention. Generally, the valve means 76 includes explosive charges 78 positioned in material 80 and located generally centrally therein and behind a wall 82 of a plug member 83. The wall 82 prohibits the pressurized fluid in the reservoir 24 from escaping through the opening 74. The explosive charges 78 are connected by suitable leads 84, 86 to a sensing device generally indicated at 87 which senses a condition indicating that the vehicle is encountering a collision or that a collision is imminent.

When such a condition is sensed, the circuit is completed through the conductors 84, 86 effecting detonation of the explosive charges 78. Upon detonation of the explosive charges 78, the material 80 fragments or crumbles and loses all of its structural strength. In addition, the explosive charges 78 break the wall 82 such that the fluid under pressure in the reservoir 24 is allowed to flow through the opening created thereby to expand the confinement 16.

In order to rotatably support the steering wheel and the end 72 of the reservoir 24 and also provide for connection of the valve means 76 with the sensing device, bearing means 88 is interposed between the splined member 48 and the member 14. The splined member 48 has a circular surface 90 thereon for receiving an insulating member 92. The insulating member 92 is retained on the splined member 48 in one direction by means of a lip 94 on the splined member 48 and in the other direction by means of a washer 96 retained by a retaining ring 98. The retaining ring 98 is received in a groove 100 in the splined member 48 such that the insulating member 92 is retained thereby.

The bearing means 88 has an inner race 102 and an outer race 104 with ball bearings 106 interposed therebetween such that the outer race 104 may rotate with respect to the inner race 102 in a manner well known to those skilled in the art. The outer race 104 of the bearing means 88 is insulated from the frame of the vehicle by means of an insulating member 108 between the outer race 102 and an outer bearing retaining member 110. The outer bearing retaining member 110 is attached to the housing member 14 by means of threaded fasteners 112 extending through the housing member 14 and threadedly engaging the outer bearing retaining member 110.

To provide a suitable electrical connection between the valve means 76 and the sensor device 87 the lead 84 is in electrical contact with the inner race 102 which is insulated from the drive means 28. The inner race 102 is in electrical contact with the outer race 104 by means of the ball bearings 106 interposed therebetween. The inner race 102 may rotate while the outer race 104 remains stationary and a rotary electrical connection may be effected thereby. The explosive charges 78 are connected in parallel and the lead 84 delivers electrical energy thereto. The lead 84 is grounded to the drive means 28 on the output side of the explosives.

The lead 86 is connected to the outer race 104 and is electrically connected to the sensor device 87. The sensor device 87 is electrically connected with a source of electrical energy such as the battery of the vehicle which is grounded to the vehicle.

When an electrical signal is provided by actuation of the sensing device 87 the circuit is completed through the conductors 84, 86 effecting detonation of the explosive charges 78. Upon detonation of the explosive charges 78, the material 80 fragments or crumbles and loses all of its structural strength. In addition, the explosive charges 78 break the wall 82 such that the fluid under pressure in the reservoir 24 is allowed to flow through the opening created by the detonation of the explosive charges 78.

The fluid expanding from the reservoir 24 continues to move through the opening 38 in the diffuser 22 and thereupon moves radially in a plane parallel to the planes of the plates 34. Upon being diffused by the diffuser 22, the pressurized fluid expands the confinement 16 from the collapsed condition 18 to the expanded position 20. As the confinement 16 expands, the cover 54 is separated into two parts 55, 56 and the confinement 16 continues to expand to the fully operative expanded condition 20.

It should be understood that the electrical energy for actuating the explosive charges 78 may be delivered thereto in a variety of ways and that a slip ring or other system may be used in place of the bearing means 88. In addition the circuitry could be varied.

The end 116 of the reservoir 24, that is, the end opposite the end connected with the steering wheel, is drivingly connected with the drive shaft 30 to effect rotation thereof upon rotation of the reservoir 24. This driving connection is effected by a clamp member 120 which encircles a hollow sleeve portion 121 of the shaft 30. The end 116 of the reservoir 24 is positioned in the sleeve portion 121 and clamped thereto by the clamp member 120. A suitable filling valve arrangement, generally designated 130, is associated with the end 116 of the reservoir 24 and provides for filling of the reservoir 24 through an opening therein which is sealed by the filling valve 130 after the reservoir 24 is filled.

The drive shaft means 30 may have a collapsible portion 136, as schematically shown in FIG. 1. It should be understood that by providing the collapsible section on the drive shaft movement of the steering wheel upon impact of the passenger thereagainst may be effected or collapse may be effected upon impact of the occupant against the inflated confinement.

It may be seen from the foregoing description that by creating a torque on the steering wheel, the torque will be transmitted from the steering wheel through the arms 26 to the drive means 28 and correspondingly through the elongated reservoir 24 to the drive shaft 30. By so constructing such a safety apparatus, a safety device with a practical design which maximizes the functional utilization of each of the parts of the system is provided. By providing a closed elongated fluid reservoir 24 for transmitting torque from the steering wheel of the vehicle to the drive shaft 30, the reservoir 24 serves the dual purpose of transmitting torque and provides a fluid supply for inflating the confinement 16.

In view of the foregoing, it is readily apparent that the applicant has provided a new and improved vehicle safety apparatus and particularly a new and improved safety apparatus for use in conjunction with a steering assembly of a vehicle and having a practical design which maximizes the functional utilization of each of the parts of the system. The safety apparatus 10 includes a confinement 16 having a collapsed position 18 and an expanded condition 20 for restraining movement of the operator or occupant during an accident. The safety apparatus 10 of the immediate invention also includes a closed elongated fluid reservoir 24 for inflating the confinement 16 to the expanded condition 20. The reservoir 24 has a first end 72 drivingly connected to the steering wheel such that a steering wheel is prohibited from axial movement with respect to the reservoir 24. The reservoir 24 also has a second end 116 drivingly connected to a drive shaft 30 so that torque exerted on the steering wheel may be transmitted through the reservoir 24 to the drive shaft 30 for steering the vehicle, Thus, the safety apparatus of the immediate invention provides a safety apparatus which maximizes the functional utilization of each of the parts of the system. It should also be understood that the present invention provides a novel electrical contact system in conjunction with the steering wheel to allow for transmission of an electrical signal from a sensor device to the valve controlling flow from the reservoir.

What is claimed is:

1. In a safety apparatus for protecting an occupant of a vehicle comprising a confinement having a collapsed condition and an expanded condition for restraining movement of the occupant during an accident and a closed elongated fluid reservoir for storing fluid for inflating said confinement to expand said confinement from the collapsed condition to the expanded condition, the improvement comprising a drive means drivingly connected with a first end of the reservoir and for driving connection to a steering wheel to transmit steering rotation from the steering wheel to the reservoir to rotate the entire reservoir, the reservoir having a second end for driving connection to a drive shaft for steering the vehicle, said drive means including first and second drive members, one of said drive members having a drive connection with said first end of said reservoir and means for clamping the steering wheel between said first and second drive members, a housing means supporting said reservoir and first and second drive members for rotation relative thereto, electrically operated means carried by said reservoir to effect flow therefrom, and roller bearing means interposed between said housing means and said first drive member for supporting said reservoir for rotation and operating to provide electrical energy to said electrically operated means.

2. In a safety apparatus for protecting an occupant of a vehicle having a steering wheel mounted for rotation about an axis relative to said vehicle, the safety apparatus including a confinement having a collapsed condition and an expanded condition for restraining movement of the occupant during an accident and a reservoir containing a fluid supply for providing fluid for inflating the confinement which comprises said reservoir having an elongated configuration, the longitudinal axis of said reservoir being disposed along the rotational axis of said steering wheel, drive means drivingly connected with a portion of the reservoir and for connection to the steering wheel of the vehicle to effect rotation of the reservoir upon rotation of the steering wheel, said reservoir having a second portion operatively associated with a drive shaft for steering the vehicle, said drive means comprising one drive member drivingly connected to the reservoir and for driving connection with the steering wheel to transmit steering torque therebetween and a clamping member cooperating with the one drive member for clamping a portion of the confinement therebetween.

3. In a safety apparatus as defined in claim 2, diffuser means for diffusing and directing fluid flow from the reservoir into the confinement and means for securing the diffuser means to the one drive member.

4. In a safety apparatus as defined in claim 3, wherein the diffuser means comprises a plurality of plates spaced from one another to provide openings for directing fluid therefrom.

5. In a safety apparatus as defined in claim 2, another drive member splined to the reservoir and connected with the one drive member, the drive members providing a clamping structure for clamping the steering wheel therebetween.

6. In a safety apparatus as defined in claim 5, a housing means supporting the reservoir and the drive members, electrically operated means associated with the reservoir to effect flow therefrom, and roller bearing means interposed between the housing means and the another drive member for supporting the fluid supply for rotation and operating to transmit electrical energy to said electrically operated means.

7. In a safety apparatus for protecting an occupant of a vehicle having a steering wheel and a steering shaft mounted for rotational motion about a steering axis relative to said vehicle, the safety apparatus including a confinement having a collapsed condition and an expanded condition for restraining movement of the occupant during a collision and a reservoir containing a fluid supply for providing fluid for inflating the confinement, the improvement which comprises;

said reservoir having an elongated cylindrical configuration, the longitudinal axis of said reservoir being disposed in coaxial relationship with said steering axis, said reservoir extending between said steering wheel and said steering shaft and mounted in driving connection with each respectively thereof whereby said reservoir is effective to transmit rotary motion therebetween.

8. In a safety apparatus as defined in claim 7, a diffuser in fluid communication with said reservoir for receiving fluid under pressure from said reservoir and diffusing the fluid under pressure into said confinement, said diffuser comprising a plurality of plates spaced from one another and an end plate, said diffuser plates having a central opening therein in communication with said reservoir to allow the fluid to flow from said reservoir and through the spaces between said plates into said confinement for expanding said confinement to the expanded condition.

9. In a safety apparatus as defined in claim 8, said diffuser plates having extending portions formed thereon extending from the surface of said diffuser plates for spacing the diffuser plates.

10. In a vehicle having a steering wheel and a steering shaft mounted for rotation about a steering axis for steering the vehicle, means extending between said steering wheel and said steering shaft and adapted for connection with each respectively thereof for transmitting rotary motion therebetween, and a safety device which is expansible for protecting an occupant of the vehicle during a collision, the improvement wherein said means comprises a reservoir having an elongated configuration, the longitudinal axis of said reservoir extending along said steering axis, one end of said reservoir having a driving connection with said steering wheel and the other end of said reservoir having a driving connection with said steering shaft, said reservoir containing a pressurized fluid supply and being actuable upon the occurrence of a collision to supply fluid for expanding said safety device.

* * * * *

UNITED STATES PATENT OFFICE
CERTIFICATE OF CORRECTION

Patent No. 3,632,135      Dated January 4, 1972

Inventor(s) Richard Chute

It is certified that error appears in the above-identified patent and that said Letters Patent are hereby corrected as shown below:

Column 1, line 21, "minimizes" should read -- maximizes --.

Signed and sealed this 2nd day of May 1972.

(SEAL)
Attest:

EDWARD M. FLETCHER, JR.       ROBERT GOTTSCHALK
Attesting Officer      Commissioner of Patents